United States Patent Office 2,911,601
Patented Nov. 3, 1959

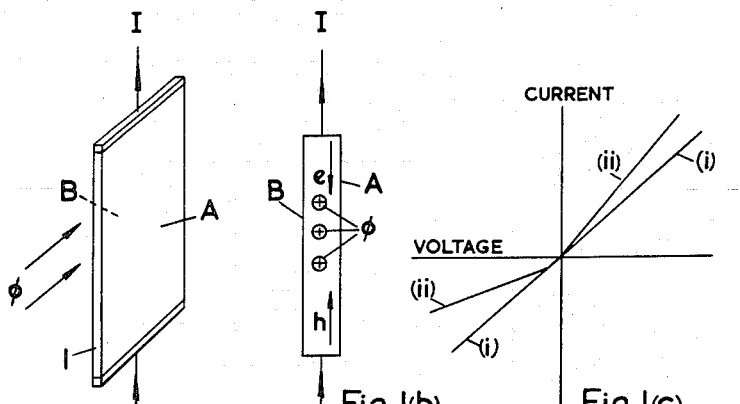
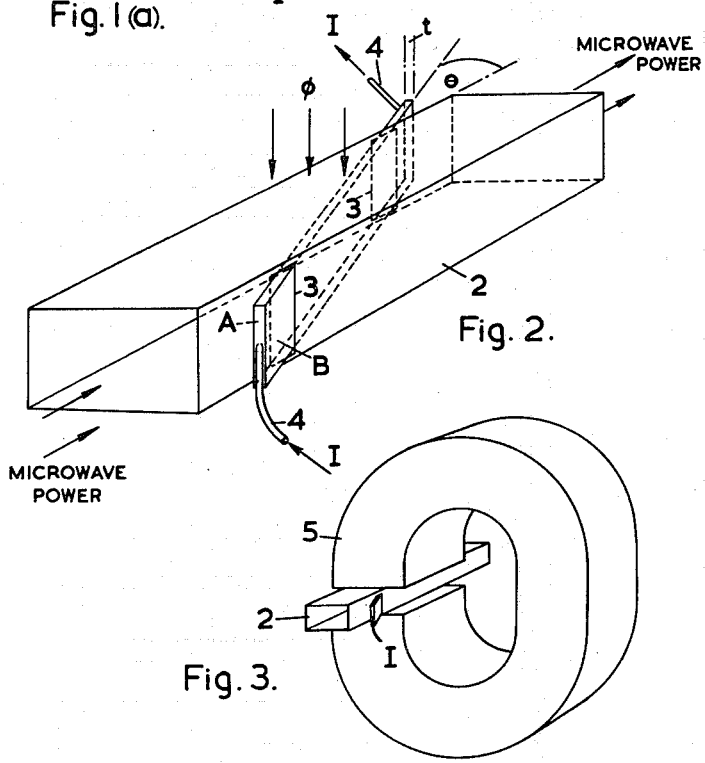

2,911,601

DEVICES FOR CONTROLLING THE TRANS-
MISSION OF ELECTROMAGNETIC WAVES

John B. Gunn and Cyril A. Hogarth, Malvern, England,
assignors to the Minister of Supply in Her Majesty's
Government of the United Kingdom of Great Britain
and Northern Ireland, London, England Application May 13, 1955, Serial No. 508,283

Claims priority, application Great Britain May 31, 1954

10 Claims. (Cl. 333—81)

This invention relates to devices for controlling the transmission of electromagnetic waves at microwavelengths.

Such devices can be of use in a number of applications in transmission systems where it is required to control the amount of microwave energy transmitted along a given path. For example in a local oscillator for a test bench it is desirable to be able to control the output power to reduce the likelihood of variations in the power fed into the test-bench. For this purpose the device should be able to control the output power in response to a signal derived from the difference between the lower oscillator output and a convenient reference level. Other desirable qualities are that it should be effective over a wide bandwidth and have a short response time.

Such a device can also be used as an active TR cell for the R.F. head of a radar system when it operates over the period of a transmitter pulse to prevent transmitter power entering the receiver.

It is an object of the invention to provide an improved device for controlling the transmission of electromagnetic waves at microwavelengths.

Accordingly the invention provides a device for controlling the transmission of electromagnetic waves comprising a transmission system defining a path for the waves, a body of semiconductor material positioned in a direction generally across the path to attenuate the waves, and means for determining the concentration of holes and electrons in the semiconductor body, whereby the transmission of waves in the system is controlled according to the conductivity of the body as determined by the concentration of holes and electrons.

In one aspect the invention provides a device for controlling the transmission of electromagnetic waves comprising a transmission system defining a path for the waves, a plate of semiconductor material positioned in the path for the waves entering from one side of the plate to pass out at the other, and means for determining the concentration of holes and electrons in the plate whereby the transmission of waves in the system is controlled according to the conductivity of the plate as determined by the concentration of holes and electrons.

In another aspect the invention provides a device for controlling the transmission of electromagnetic waves comprising a transmission system defining a path for the waves, a body of semiconductor material positioned in the path for attenuating the waves according to the conductivity of the material, the body defining two zones of different surface recombination velocity of current carriers and being adapted to carry a current through that part of the body in the wave path, and a magnetic field system for deflecting current carriers in the body towards each of the two zones according to the direction of current flow, whereby the conductivity of the semiconductor material is determined according to the current flow therein to control attenuation of the transmitted waves.

In a further aspect the invention provides a device for controlling the transmission of electromagnetic waves comprising a transmission system defining a path for the waves, a plate of semiconductor material positioned in the path for waves entering one side of the plate to pass out at the other, the plate defining a current path across the wave path, the two sides defining surfaces having different surface recombination velocities of current carriers, a magnetic field system for deflecting current carriers in the plate towards one of the two sides according to the direction of current flow whereby the transmission of waves in the system is controlled according to the current flowing in the current path. In order to make the invention clearer a brief discussion of certain phenomena upon which the invention depends will be followed by a description of an attenuator for waves at microwavelengths in which the conduction of a body of semiconductor material is controlled according to the concentration of holes and electrons in the body and thereby according to carrier extraction-injection phenomena occurring in the body. Reference will be made to the accompanying drawings, in which:

Fig. 1($a$, $b$, $c$) shows diagrams useful in understanding the phenomena involved, Figs. 2 and 3 show the arrangement of an attenuator for electromagnetic waves.

Conduction in semi-conductors

Semi-conductors, of which germanium and silicon are examples, conduct electricity by virtue of the free charge carriers, electrons or positive holes, which are excited ($a$) from impurity centres in the material itself — extrinsic conduction, and ($b$) internal transitions within the material itself — intrinsic conduction. In general extrinsic conduction is observed at low and normal temperatures and intrinsic conduction at high temperatures. Germanium may be obtained in a form sufficiently pure for intrinsic conduction to take place at room temperature. It may be expected that silicon and other semi-conductor materials can be obtained in such form. For the purposes of the present discussion it will be sufficient to consider germanium of sufficiently high purity for some observable intrinsic conduction to occur at, say room temperature, the temperature at which it is convenient to carry out most experiments.

Carrier extraction and injection

If some means is found of reducing the concentration of intrinsically generated holes and electrons in such material, then the resistance of the specimen will increase an it will tend to behave as an extrinsic or impurity semiconductor. This may be achieved if means are found to enable the free holes and electrons to be "extracted" more rapidly than they are generated thermally.

E. Weisshaar and H. Welker ["Magnetische Sperrschichten in Germanium" (Magnetic barrier layers in germanium) Z. Naturforschung 8$a$, 681, (1953)] show how, by means of electric and magnetic fields, a variation of the concentration of holes and electrons may be obtained in a slab of semi-conductor material.

In Fig. 1($a$) a surface A of a slab of germanium crystal 1 is etched so that the parameter which determines the rate of recombination of holes and electrons at the surface, the surface recombination velocity S, is made as small as possible. The opposing surface B is abraded or otherwise suitably treated to make S as large as possible. A current I flows in the direction shown and a magnetic field $\phi$ is applied in the direction indicated.

Considering now Fig. 1($b$) a current I flowing as shown consists of holes flowing in the direction $h$ and electrons in the direction $e$. A magnetic field $\phi$ into the plane of the diagram will cause both holes and electrons to be deflected to the surface B. Since this surface has a large value of S the concentration of free holes and electrons will be reduced. In principle all the intrinsically generated holes and electrons could be removed by means of suitable design of the shape of the crystal 1, a high enough magnetic field, and so on. Because there are now fewer free electrons and holes the resistance of the specimen will have increased. The limiting slope resistance of the material is infinite for an ideally pure specimen but in any practical case it is set by the residual free carriers, i.e. those derived from impurities or lattice imperfections.

Consider now the case when the direction of either the magnetic field $\phi$ or the current I shown in Fig. 1(b) is reversed. Then the holes and electrons will be deflected to the surface A and since this surface has a low value of S there will tend to be an increase in the concentration of holes and electrons. Thus we may, by means of a suitable arrangement of magnetic fields and electric currents, cause (a) extraction, or (b) injection of free charge carriers in the crystal 1. If the voltage across the crystal 1 is measured as a function of the current passing, a curve such as curve (i) is obtained in the absence of a magnetic field and curve (ii) with a magnetic field $\phi$ applied (Fig. 1(c)).

It has been verified by experiment that germanium of resistivity 40 ohm cm. and carrier lifetime 100 microseconds is suitable for showing magnetic injection and extraction. Germanium of resistivity slightly higher (say 50–55 ohm cm.) would be more suitable. (40 ohm cm. germanium corresponds to approximately $2.8 \times 10^{13}$ impurities per cm.$^3$, 50–55 ohm cm. germanium would be considerably purer.) In the experiments the slope resistances were measured in the two directions (with 40 ohm cm. Ge) and had a ratio of 4:1 at 20° C. An interesting discovery was that there was an improvement in the ratio to 28:1 on heating to 70° C.

In the experiments the germanium crystals were of the shape shown in Fig. 1(a). Typically suitable sizes are 2 cm. long x 3 mm. wide x 0.5 mm. thick. This thickness is to some extent determined by the diffusion length $x$ for holes and electrons or their lifetime $\tau$. For germanium of high crystal quality, e.g. of large $\tau$ or $x$, a thicker specimen is more acceptable than for lower quality crystals. For crystals of resistivity 40 ohms cm., 0.3 mm. is a convenient thickness.

To produce an etched surface with a large value of $\tau$ or a small value of S the face A of the crystal 1 must be treated with a suitable etching agent such as CP–4 etch (see R.D. Heidenreich U.S. Patent No. 2,619,414, 1952); an alternative method is by treating with 5 to 10% $H_2O_2$ at 60° C. for a suitable period (of the order of 20 minutes).

To produce the surface B of low $\tau$ or large S the surface B must be abraded, for example by grinding with 0000 emery cloth or grinding with 600 Carborundum on glass.

It has thus been shown how the concentration of free charge carriers in a body of semi-conducting material such as that described above can be controlled simply by means of a magnetic and electric fields; the concentration may be made to follow alternations of the electric field set up by the current I or alternations set up in the magnetic field.

*Microwave attenuator*

A microwave attenuator using injection and extraction will now be described with reference to Figs. 2 and 3.

A rectangular waveguide 2 is arranged to carry microwave power in the direction shown. A slab 1 of semiconducting material is set across the waveguide 2 and has wide faces B, A parallel to the electric vector in the waveguide 2. The slab 1 is inserted through slots 3 in the side of the guide 2, obstructing it almost completely; the slab 1 is set at an angle $\theta$ to the direction of propagation. The faces B, A of the slab 1 are suitably treated so as to have a large and a small recombination velocity respectively and electrical leads 4 are attached to its ends by soldering. A control current I is passed through the slab 1 by means of these leads 4. A magnetic field $\phi$ is applied by means of a permanent magnet 5 outside the waveguide 2 (Fig. 3). The waveguide 2 is not of ferromagnetic material. A coating of insulating material such as polystyrene is applied to the surface of the slab 1 to insulate it from the guide 2 and to protect it from contamination.

In this structure, the attenuation of the microwave power passing the slab 1 is dependent on the number of free carriers the slab 1 contains, being small when there are no free carriers, and reaching a large value when there are many. (A certain amount of reflection loss will occur, however, because of the usually high dielectric constant of suitable semiconductors. This may be minimised by making the value of $\theta$ small.) Hence, if the relation between the control current I and the magnetic field $\theta$ is such as to cause carrier extraction, as explained above, only the residual carriers will contribute to the attenuation. This value of the attenuation, the insertion loss, can in principle be made as small as desired by making the slab 1 from a semi-conductor material of high enough purity and lifetime, and using a small value for the thickness $t$ and a large value of $\theta$. If the current I is reversed so as to cause injection, the attenuation will be large, the theoretically maximum value being determined by the maximum number of carriers which can be injected. In practice, this number is limited by the maximum value of the control current I which can be used without excessive heating; a large value for the thickness $t$ and a small value of $\theta$ are then desirable.

The rapidity with which the attenuation follows changes in the control current I is also determined by the thickness $t$, the best transient response being obtained when the thickness is small.

In designing an attenuator, the purity and lifetime of the material should be made as high as possible. The thickness $t$ must be chosen as a compromise between low insertion loss, reflection, and response time on the one hand, and high maximum attenuation on the other. $\theta$ is chosen from similar considerations, except that it does not affect the response time.

In an attenuator which has been constructed the design parameters are:

Wavelength _____ 8 mm.
Germanium slab:
    Impurity density _____ $\sim 3 \times 10^{13}$ cm.$^{-3}$
    Bulk lifetime _____ $\sim 100/\mu$s.
    Thickness $t$ _____ 0.006″.
    Angle $\theta$ _____ $\sim 30°$.
    Magnetic field $\phi$ _____ $\sim 8000$ oersted.

and the performance is:

Insertion loss _____ 3.7 db.
Maximum attenuation:
    With D.C. control current _____ 17.7 db.
    With pulsed control current ____ 33 db.
Response time:
    Attenuation increasing _____ $\sim 4/\mu$s.
    Attenuation decreasing _____ $\sim 1/\mu$s.
Voltage standing wave ratio _____ 1.4 to 1.

An application for the attenuator is its use in the R.F. head of a radar system as an active TR cell, then the control current I is switched on just before the transmitter output R.F. pulse, and off at the end of the R.F. pulse. It constitutes broadband device, having a short dead time, and probably a long life compared with conventional gas-filled cells.

Another application is in an A.V.C. system for control of power in local oscillators for test benches. The control current I would then be derived from the difference between the oscillator power output and a convenient reference level. It would have a wide bandwidth and a short response time compared with ferrite and gas tube attenuators.

A further application is as a chopper for use in microwave radiometers to modulate the incoming signal. It would be used in place of the mechanical disc at present used.

The range of wavelengths for which the attenuator device described is suitable is probably limited to approximately 4 mm. to 3 cm. With shorter wavelengths, difficulty would be expected in fabricating the thin slab required, whereas at longer wavelengths it would be difficult to obtain large enough pieces of semiconductor material with suitable properties.

The use of the principle of magnetic injection-extraction for the control of attenuation is not limited to the attenuator device described. It is anticipated that it will be possible to use transmission systems of other forms such as a coaxial line or parallel wires, with which an absorbing slab could be used; even quasi-optical techniques, for use at very short wavelengths, are included, the slab of semiconductor material being placed, for example, over the mouth of a horn or in the path of a microwave beam. It is also contemplated that guided surface waves on a single wire may also be controlled using the magnetic injection-extraction principle.

We claim:

1. A device for controlling the transmission of microwave radiation comprising a transmission system defining a path for the waves, a body of semiconductor material positioned in a direction generally across the path to attenuate the waves and having a zone in which recombination of holes and electrons takes place more easily than in the rest of the body, and means for controlling the concentration of holes and electrons in the semiconductor body comprising means for feeding a current through the part of the body in the path of the waves and means for controllably directing the current through the zone of easier recombination, whereby the transmission of waves in the system is controlled according to the conductivity of the body as determined by the concentration of holes and electrons.

2. A device for controlling the transmission of microwave radiation comprising a transmission system defining a path for the waves, a plate of semiconductor material positioned in the path for the waves entering from one side of the plate to pass out at the other and having a zone in which recombination of holes and electrons takes place more easily than in the rest of the plate, and means for controlling the concentration of holes and electrons in the plate comprising means for feeding a current through a part of the plate in the path of the waves, and means for controllably directing the current through said zone of easier recombination whereby the transmission of waves in the system is controlled according to the conductivity of the plate as determined by the concentration of holes and electrons.

3. A device for controlling the transmission of electromagnetic waves comprising a transmission system defining a path for the waves, a body of semi-conductor material positioned in the path for attenuating the waves according to the conductivity of the material, the body defining two zones of different surface recombination velocity of current carriers, terminal connections to the semiconductor body for feeding a current through the part of the body in the path of the waves, and a magnetic field system for deflecting current carriers in the body towards each of the two zones according to the direction of the current flow, whereby the conductivity of the semiconductor material is determined according to the current flow therein to control attenuation of the transmitted waves.

4. A device for controlling the transmission of electromagnetic waves comprising a transmission system defining a path for the waves, a plate of semiconductor material positioned in the path for waves entering one side of the plate to pass out at the other, the plate defining a current path across the wave path, the two sides defining surfaces having different surface recombination velocities of current carriers, a magnetic field system for deflecting current carriers in the plate towards one of the two sides according to the direction of current flow whereby the transmission of waves in the system is controlled according to the current flowing in the current path.

5. A device as claimed in claim 4, wherein the transmission system comprises a waveguide.

6. A device as claimed in claim 4, wherein the transmission system comprises a section of rectangular waveguide and the plate comprises a rectangular strip of semiconductor material insulated from the waveguide and extending between the narrow faces, the current path extending longitudinally of the strip.

7. A device as claimed in claim 6, wherein the rectangular strip is located in holes in the narrow faces of the waveguide.

8. A device as claimed in claim 6, comprising a permanent magnet defining an airgap between opposing pole faces for establishing the magnetic field, the magnet being positioned so that the broad faces of the waveguide enclosing the semiconductor strip face the pole faces of the magnet.

9. A device as claimed in claim 7, comprising a permanent magnet defining an airgap between opposing pole faces for establishing the magnetic field, the magnet being positioned so that the broad faces of the waveguide enclosing the semiconductor strip face the pole faces of the magnet.

10. A device as claimed in claim 4, wherein one surface defined by the semiconductor plate is etched and the other is abraded.

References Cited in the file of this patent

UNITED STATES PATENTS

| | | |
|---|---|---|
| 2,430,130 | Linder | Nov. 4, 1947 |
| 2,532,157 | Evans | Nov. 28, 1950 |
| 2,649,574 | Mason | Aug. 18, 1953 |
| 2,692,950 | Wallace | Oct. 26, 1954 |
| 2,743,322 | Pierce et al. | Apr. 24, 1956 |
| 2,801,389 | Linder | July 30, 1957 |

OTHER REFERENCES

Article: "Non-Rectifying Germanium" by Dunlap and Hennelly, pub. in "Physical Review," vol. 74, issue 8, page 976.